Figure 2A:
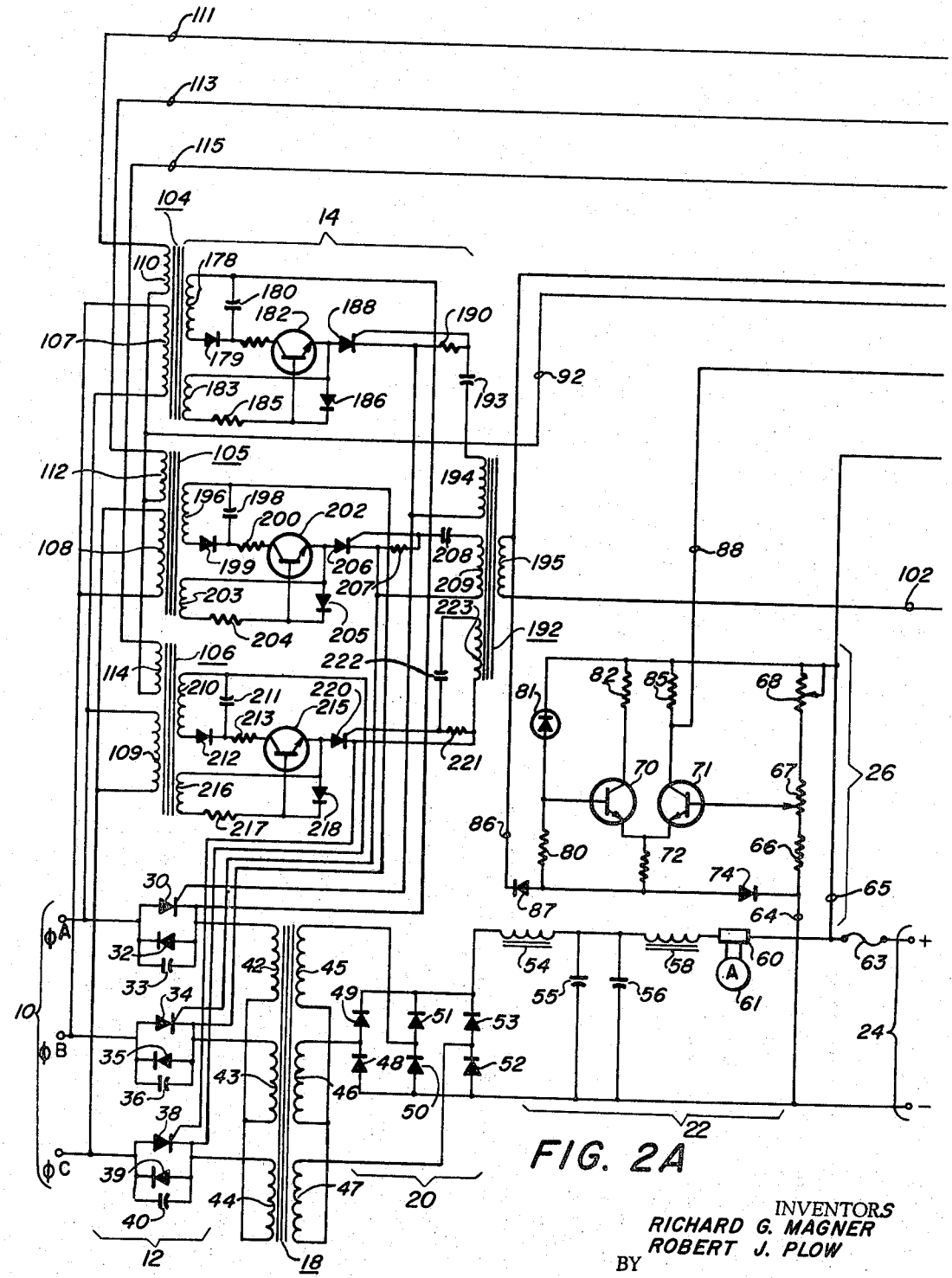

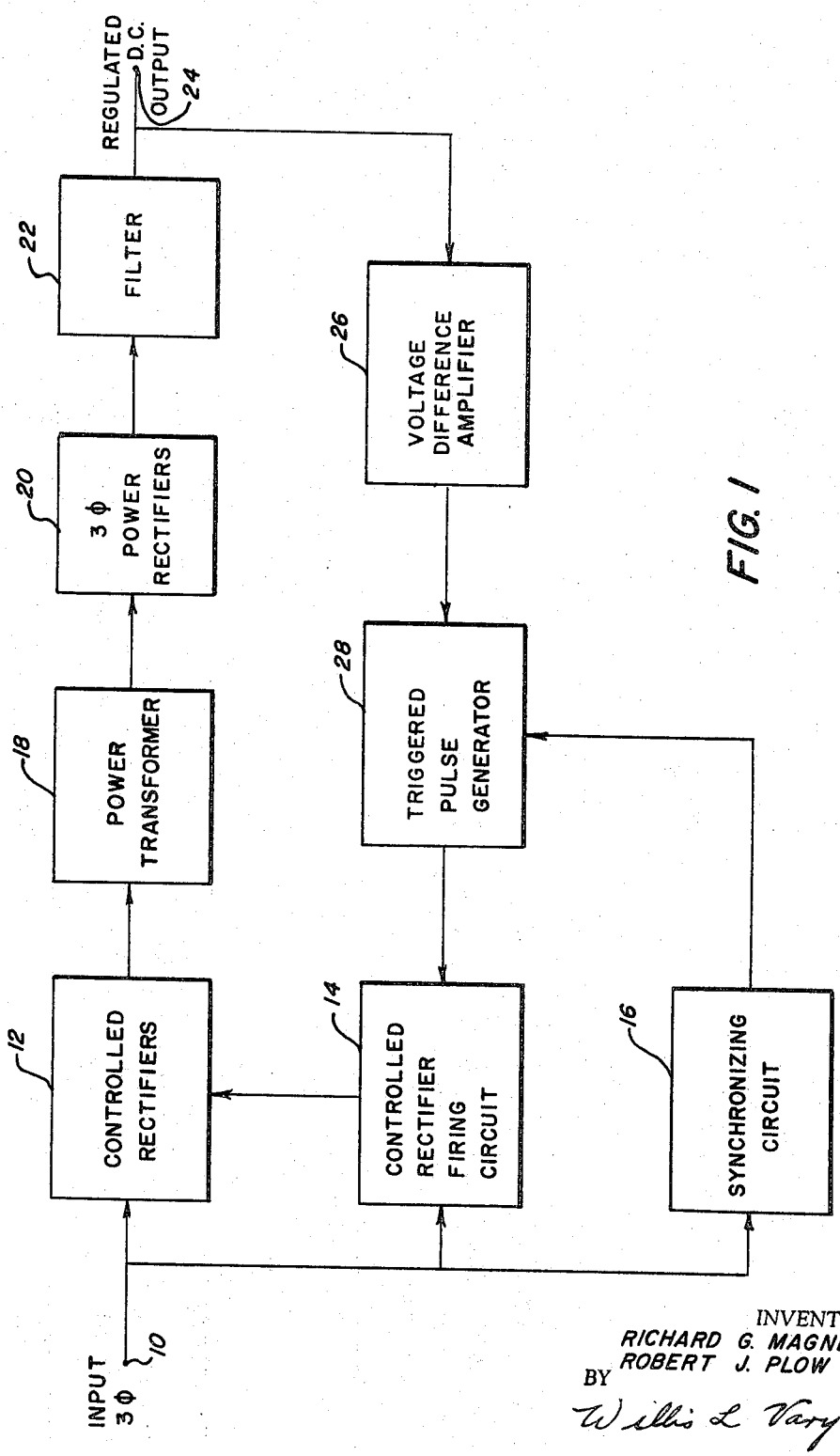

March 26, 1968   R. G. MAGNER ET AL   3,375,427
POLYPHASE RECTIFIER
Filed March 12, 1964   3 Sheets-Sheet 2

INVENTORS
RICHARD G. MAGNER
ROBERT J. PLOW
BY
Wilbur L. Vary

INVENTORS
RICHARD G. MAGNER
ROBERT J. PLOW
BY
Willis L. Vary

United States Patent Office 3,375,427
Patented Mar. 26, 1968

3,375,427
POLYPHASE RECTIFIER
Richard George Magner, Lorain, and Robert J. Plow, Avon Lake, Ohio, assignors to Lorain Products Corporation, a corporation of Ohio
Filed Mar. 12, 1964, Ser. No. 351,505
10 Claims. (Cl. 321—5)

This invention relates to polyphase rectifiers and, more particularly, to an improved polyphase rectifier employing controlled rectifiers.

Polyphase rectifier employing controlled rectifiers such as thyratrons and other controlled rectifiers are well known in the art. The more recent of these systems generally employs solid state rectifiers such as silicon controlled rectifiers in the output circuit of a polyphase power transformer to control the magnitude of unilateral impedance in series with the direct current load and thus regulate the power delivered to the load. These systems, however, exhibit certain disadvantages. For example, the controlled rectifiers must have a relatively high current rating if they are serially connected in the load circuit and therefore are relatively expensive. Further, this problem is not simply solved by connecting the controlled rectifiers in series wtih the primary windings of the power transformer, i.e., in the low current section of the rectifier because this arrangement introduces new problems. For example, complicated control circuits are required to control accurately the conduction of the controlled rectifiers because of the problems of synchronizing the firing, or conduction, of the controlled rectifiers with the input waves and, further, because of the critical requirement of accuracy of placement of the firing pulse on the respective controlled rectifiers. Further, many of these systems do not include provision for automatically varying the output power for variations in the load.

Accordingly, it is an object of this invention to provide an improved polyphase rectifier.

Another object of this invention is to provide an improved polyphase rectifier employing solid state devices in which the rectifier quickly and accurately responds to changes in the output load.

Still another object of this invention is to provide an improved polyphase rectifier which is particularly capable of responding to variations in light loads by controlling firing of a plurality of controlled rectifiers to thus limit the power delivered to the load.

Still another object of this invention is to provide a polyphase rectifier system employing solid state, controlled rectifiers in each phase in which at high line voltage, or no load where very short conduction time of each conducting rectifier is required, the rectifiers will skip conduction on some half cycles in order to keep the output voltage to a relatively low value.

A still further object of this invention is to provide a polyphase rectifier with a simplified synchronizing circuit which accurately controls the phase of the firing pulses for the controlled rectifiers.

It is a still further object of this invention to provide a solid state, polyphase rectifier with a synchronizing circuit which includes a phase shift circuit for accurately adjusting the phase of the synchronizing pulses relative to the polyphase input and thereby accurately control the setting for the output power of the rectifier.

It is a still further object of this invention to employ, in a polyphase rectifier utilizing solid state controlled rectifiers, a synchronizing circuit which produces as output short, sharp spikes so that the synchronizing can be accurately controlled.

It is yet another object of this invention to employ, in a polyphase rectifier, controlled rectifiers in the input circuit of a power transformer, a synchronizing circuit for developing accurate, short synchronizing spikes, the phase of which can be accurately controlled, a controlled pulse generator coupled to the output of the synchronizing circuit and including a loop equalization network to prevent instability and a firing circuit for the controlled rectifiers coupled to the output of the controlled generator, which controlled pulse generator is also coupled through a reference amplifier to the output filter of the rectifier to respond to variations in output potential.

It is a still further object of this invention to provide a solid state, polyphase rectifier in which controlled rectifiers are employed in the primary circuit of a power transformer to control accurately the pulse width of pulses applied to the power transformer and thus to control accurately the power delivered to the load, which system includes a synchronizing circuit for developing short, sharp spikes and includes a phase adjusting network for accurately controlling the phase of the spikes relative to the polyphase input waves, a single controlled pulse generator coupled to the output of the syhchronizing circuit and coupled to a reference amplifier, which amplifier is connected to the output filter of the rectifier and individual firing circuits for the controlled rectifiers, the controlled generator having an output connected to individual firing circuits, each powered from one of the input phases, which controlled pulse generator pulses all of the firing circuits so that a combination of the input wave and a controlled generator pulse is required to fire each of the firing circuits to thereby accurately control the respective power handling controlled rectifier in the primary winding of the input transformer.

Briefly, in accordance with aspects of this invention, we have discovered that an improved polyphase rectifier system, such as a three-phase rectifier system, can be provided with a group of controlled rectifiers, a power transformer having an input winding for each phase or a group of transformers, one for each phase, each rectifier connected in series with one of the input phase windings and one of the three-phase power input terminals, a number of power rectifiers connected to the output windings of the power transformer for rectification of the alternating current to direct current, an output filter connected to the power rectifiers, a reference amplifier connected across the output filter to derive a reference voltage therefrom, a controlled pulse generator connected to the output of the reference amplifier and connected to a controlled rectifier firing circuit for controlling the rectifiers connected to each input winding of the power transformer, and a synchronizing circuit coupled to the three-phase input terminals and to the controlled pulse generator.

In accordance with other aspects of this invention, a single controlled pulse generator is connected in the feedback path between the direct current output filter and the controlled rectifier firing circuits of a polyphase rectifier, which controlled pulse generator provides a single output which is employed, in combination with the polyphase input waves, selectively to control the firing of one of the controlled rectifier firing circuit. In accordance with still other aspects of this invention, we employ, in a three-phase rectifier system having controlled rectifiers in series with the input windings of the power transformer, a controlled rectifier firing circuit for each controlled rectifier connected to one of the phases of the three-phase input and to one of the controlled rectifiers, a synchronizing circuit including a phase shift circuit coupled to the three-phase input for deriving pulses of short duration from the three-phase input, the phase shift circuit shifting the phase of pulses derived by the synchronizing circuit relative to the three-phase input waves, a controlled pulse generator coupled to the firing circuits and coupled to the output of the synchronizing circuit, which controlled pulse generator is controlled by the sharp spikes from the synchronizing circuit to control accurately the triggering of the firing circuit whereby the controlled rectifiers are accurately fired, thereby closely regulating the output voltage in accordance with the varying input voltage.

In accordance with more specific aspects of this invention, we provide, in a synchronizing circuit for a three-phase rectifier employing solid state devices, a plurality of semiconductors, means for deriving a bias from the phases of the three-phase input and applying this bias to one of the electrodes of each of the semiconductors and means to adjust this bias to thereby achieve a variation of the synchronizing pulses developed by the semiconductors over a range of the order of 100 to 120 electrical degrees and at least as low as 100 degrees and preferably in the order of 110 to 115 degrees thereby accurately controlling the conduction of the power handling controlled rectifiers.

In accordance with still other aspects of this invention, we provide, in a synchronizing circuit for a polyphase rectifier, a plurality of semiconductors and a corresponding plurality of differentiating circuits, each connected to the output of one of the semiconductors and each having its output connected to the input of a controlled generator to control the initiation of the generation of pulses by the controlled generator in accordance with the short, sharp spikes derived by differentiating the respective outputs of the semiconductors.

In accordance with yet other specific aspects of this invention, we provide, in a three-phase rectifier employing semiconductor controlled rectifiers in circuit with the input windings of a power transformer, an arrangement for selectively controlling the conduction of these semiconductor rectifiers including a firing circuit, a controlled pulse generator connected to supply pulses to the firing circuit, which controlled pulse generator includes a loop equalization network to prevent instability of the system as evidenced, for instance, by hunting. The controlled pulse generator is coupled to the output filter of the rectifier through a reference amplifier, which reference amplifier delivers a control signal to the controlled pulse generator in accordance with the output potential at the output filter.

Figure 2B:
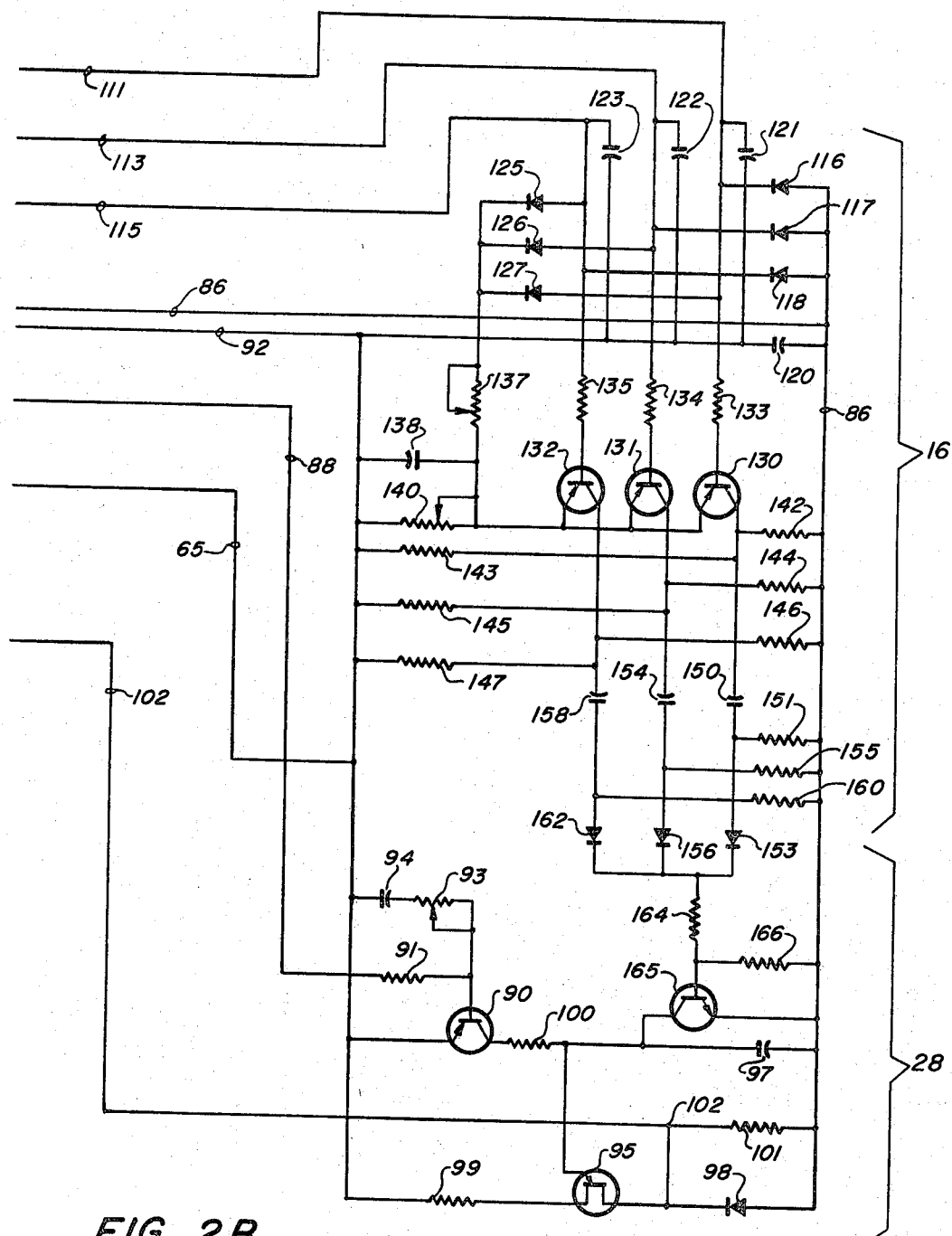

These and various other objects and features of the invention will be more clearly understood from a reading of the detailed description of the invention in conjunction with the drawing which shows a preferred embodiment of the invention in which:

FIGURE 1 is a block diagram of one illustrative embodiment of polyphase rectifier according to this invention; and FIGURES 2A and 2B, when placed side by side so that corresponding lines coincide, are a schematic representation of a preferred embodiment of the invention.

Referring now to FIGURE 1, there is shown, in block form, one illustrative embodiment of this invention in which a three-phase input is fed from an input 10 to a group of controlled rectifiers 12, including at least one controlled rectifier for each phase. This three-phase input is also fed to a controlled rectifier firing circuit 14 and a synchronizing circuit 16. The output of the controlled rectifiers is fed to the input windings of a power transformer 18 and the output windings of the power transformer are connected to a group of three-phase power rectifiers 20. The output of the three-phase rectifiers 20 is fed through a suitable filter 22 to a regulated direct current output 24. A feedback signal from the output of filter 22 is also fed to a reference amplifier 26 which compares this feedback signal to a reference voltage and delivers an output signal to a controlled pulse generator 28 indicative of this comparison. The output of synchronizing circuit 16 is also fed to the controlled pulse generator 28 and the controlled pulse generator generates output pulses in accordance with the combination of signals from the synchronizing circuit 16 and the reference amplifier 26 and feeds controlled pulses to the controlled rectifiers firing circuit 14 which, in turn, delivers control pulses to the controlled rectifiers 12.

FIGURES 2A and 2B depict, in schematic form, a preferred embodiment of the invention. The three-phase input 10 includes three terminals each connected to one of the respective phases of the conventional three-phase line. Each of these terminals is connected to a controlled rectifier network including a controlled rectifier, a reverse connected diode and a capacitor, all connected in parallel. The first network includes controlled rectifier 30, reverse connected diode 32 and capacitor 33. The second network includes rectifier 34, reverse connected diode 35 and capacitor 36. The third network includes controlled rectifier 38, reverse connected diode 39 and capacitor 40. The controlled rectifiers each include a cathode, an anode and a gate electrode and may preferably be of the type known as silicon controlled rectifiers which may be selectively rendered conducting by the application of a firing pulse to the gate electrode at the time a potential is applied between the cathode and anode. The reverse connected diodes 32, 35 and 39 provide return paths for the polyphase current while the capacitors 33, 36 and 40 bypass high frequency noise on the transmission line. The power transformer 18 has three input windings 42, 43 and 44 which are Y connected and connected to the controlled rectifiers 30, 34, 38, respectively. Transformer 18 includes three Y connected output windings 45, 46 and 47 and these output windings are connected to a group of power rectifiers 20 which includes rectifiers 48, 49, 50, 51, 52 and 53 connected for three-phase rectification in a manner well known in the art. The output of power rectifiers 20 is supplied to a filter circuit which includes a first serially connected inductance 54, a pair of shunt connected capacitors 55, 56 and a second serially connected inductance 58, the output of which is connected to a pair of output terminals 24 through the shunt 60 of an ammeter 61 and a fuse 63.

The output potential at terminals 24 is accurately controlled in accordance with the varying load conditions through a feedback network which controls the firing of the controlled rectifiers 30, 34 and 38 to thereby control the pulse width of the pulses applied to input windings 42, 43 and 44 in a manner which will be subsequently described. The feedback path includes a reference amplifier 26 which, in this particular instance, is a difference amplifier having its input terminals connected across the output of the filter 22.

Reference amplifier 26 is, in fact, a difference amplifier having its input terminals 64, 65 connected to the output terminals 24 of the filter 22. A voltage divider network including serially connected resistors 66, 67 and 68 is connected between terminals 64, 65. It is to be noted that resistors 67, 68 are variable to vary the amount of signal from the output terminals being applied to the reference amplifier. Preferably, resistor 68 is relatively large to produce coarse regulation of the required potential while resistor 67 is relatively small. For example, resistor 67 may have a resistance only one-tenth as large as the resistance of resistor 68 to provide a fine adjustment for the potential being applied to the comparison portion of the difference amplifier. The comparison portion of difference amplifier 26 includes a pair of transistors 70, 71 connected in a common emitter configuration to a common emitter bias resistor 72, which resistor is connected through a diode 74 to the reference amplifier input terminal 64. The base transistor 71 is connected to the variable tap of resistor 67. The base of transistor 70 is connected through a resistor 80 to the terminal of resistor 72 remote from the emitter electrodes of the transistors 70, 71. A Zener diode 81 is connected between reference amplifier input terminal 65 and the base of transistor 70 to maintain the potential between the collector and base electrodes of the transistor 70 at a constant reference value. Zener diode 81 is connected through a resistor 82 to the collector electrode of transistor 70. A resistor 85 is connected between terminal 65 and the collector electrode of transistor 71. The reference amplifier 26 is connected to a system bus 86 through a diode 87. The output of reference amplifier 26, which is a signal indicating a comparison of the potential across that portion of voltage divider 66, 67 and 68 between bus 65 and the base lead of transistor 71 with that across Zener diode 81, is fed from output terminal 88 connected to the collector electrode of transistor 71.

This signal is fed to the controlled pulse generator 28 and, specifically, to a base electrode of a transistor 90 in the controlled pulse generator through a suitable resistor 91. The base electrode of transistor 90 is connected to a system bus 92 through a serially connected variabler esistor and capacitor 93, 94, respectively, which series circuit advantageously provides variable loop equalization which may be adjusted to prevent the system from hunting. System bus 92 is connected to terminal 65 of reference amplifier 26. The controlled pulse generator 28 includes a unijunction transistor 95 connected as a pulse type oscillator to generate spike type pulses in which its emitter and one of its base electrodes are connected to a frequency controlling capacitor 97, the base being connected to the capacitor 97 through a diode 98 while the emitter is directly connected to capacitor 97. The other base electrode is connected throughh a resistor 99 to the system bus 92. The emitter electrode of transistor 90 is also connected to the system bus 92. The collector electrode of transistor 90 is connected through a resistor 100 to the frequency controlling capacitor 97 and to the emitter of transistor 95. A resistor 101 is connected in parallel with diode 98 and an output terminal 102 is connected to the junction of resistor 101, diode 98 and one of the base electrodes of transistor 95. Controlled spike type pulses are fed from the terminal 102 to the firing circuit in a manner which will be subsequently described. In addition to being controlled by the difference signal from the reference amplifier, the controlled pulse generator is also controlled by pulses from synchronizing circuit 16. These pulses are derived from the three-phase input wave at input 10 and are applied to generator 28 so that the synchronizing circuit controls the initiation of the generation of each of the pulses from the controlled pulse generator 28. The synchronizing pulses are employed to control the discharge of the frequency determining capacitor 97 in generator 28 and the charging rate of this capacitor 97 is controlled by the output signals from the reference amplifier 26.

The synchronizing circuit 16 derives synchronizing pulses from each of the phases of the input terminal 10 through individual output windings of transformers 104, 105 and 106 having input windings 107, 108 and 109, respectively, connected to one of the phases of the three-phase input 10. An output winding 110 of transformer 104 is connected to an input terminal 111 of the synchronizing circuit 16. An output winding 112 of transformer 105 is connected to an input terminal 113 of synchronizing circuit 16 while transformer 106 has an output winding 114 connected to an input terminal 115 of synchronizing circuit 16. Synchronizing circuit 16 includes a first group of three rectifiers 116, 117 and 118, each having its cathode connected to one of the synchronizing circuit input terminals and having its anode connected to the system bus 86 to develop power for the synchronizing circuit 16. System bus 86 is connected to one electrode of a suitable filter capacitor 120, the other electrode of which is connected to system bus 92 to filter the output of rectifiers 116, 117 and 118. One of a group of three filter capacitors 121, 122 and 123 is provided between each of the three synchronizing circuit input terminals 111, 113 and 115 and one of the electrodes of capacitor 120 to act as hash filters to bypass any high frequency signals which might be present at the input terminals. Synchronizing circuit 16 includes a second group of three rectifiers 125, 126 and 127 having their cathodes connected together and their anodes connected to one of the synchronizing circuit input terminals 111, 113 and 115. This last group of three rectifiers derives the emitter bias for a group of three transistors 130, 131 and 132, each having its base electrode connected to one of the synchronizing circuit input terminals through a suitable resistor 133, 134 and 135, respectively. The output of rectifiers 125, 126 and 127 is fed through a phase shift controlling network including a first variable resistor 137, a capacitor 138 and a second variable resistor 140, which network develops a bias for the emitter electrodes of transistors 130, 131 and 132. Advantageously, resistor 137 is a serially connected variable resistor while resistor 140 is a shunt connected variable resistor, which combination of variable resistors controls the level of the emitter bias on transistors 130, 131 and 132. Thus, the three-phase sine wave signals are fed to the bases of these transistors but the transistors will begin to conduct only when the respective sine wave signal exceeds the emitter bias. Thus, the phase relationship between the input sine waves and the output pulses which are advantageously rectangular waves may be adjusted by adjusting the bias on transistors 130, 131 and 132.

The values of the variable resistors 137, 140 and capacitor 138 are such that the phase of the rectified wave can be varied at least as low as 100° after the half sine wave from which it is derived and as high as 119°. Preferably, the phase is adjusted between 110° and 115°. The phase shift should never be set at 120° because the next controlled rectifier 30, 34 or 38 in the firing sequence will be turned on for the entire half cycle and thus prevent proper regulation.

The collector electrode of each of transistors 130, 131 and 132 is connected intermediate a respective voltage divider network connected between system busses 86, 92. These networks include resistors 142, 143; resistors 141, 145; and resistors 146, 147. These voltage divider networks provide the necessary bias for the collector electrodes of the synchronizing circuit transistors 130, 131 and 132. The rectangular wave output derived from the collectors of transistors 130, 131 and 132 is fed through respective differentiating circuits, each comprising a serially connected capacitor and a shunt connected resistor, which circuits differentiate the rectangular waves and deliver short sharp spikes of current to their output. For example, the collector of transistor 130 is connected through a capacitor 150 to a resistor 151 and to an output diode 153. The collector of transistor 131 is connected through a capacitor 154 to a resistor 155 and to an output diode 156. The collector of transistor 132 is connected through a serially connected capacitor 158 to a resistor 160 and an output diode 162. The cathodes of diodes 153, 156 and 162 are connected through a common resistor 164 to the base electrode of a transistor 165 which receives these short sharp spikes of current. The emitter and collector electrodes of transistor 165 are connected across frequency controlling capacitor 97 to act as a discharging circuit for the capacitor in a manner which will be subsequently described. A suitable base biasing resistor 166 is connected between the system bus 86 and the base electrode of transistor 165 to apply a suitable base bias thereto to normally maintain transistor 165 in a nonconducting condition. If, however, transistor 165 is rendered conducting by a current pulse from either one of the transistors 130, 131 or 132 fed through its respective diode 153, 156 or 162, transistor 165 conducts and discharges capacitor 97 to start the charging cycle of this capacitor which is charged through resistor 100 and transistor 90. Transistor 90 acts as a variable resistance to control the charging rate of capacitor 97 in accordance with the signal from reference amplifier 26 fed through resistor 91. The charging rate of capacitor 97 controls the frequency of the firing of transistor 95.

The firing circuit 14 for the controlled rectifiers 12 includes three identical circuits, each connected to two output windings of one of transformers 104, 105 and 106. For example, an output winding 178 of transformer 104 is connected to a diode 179 and a capacitor 180 to supply a direct current potential through a resistor 181 to the collector of a gating transistor 182. Another output winding 183 of transformer 104 is connected to a resistor 185 and a diode 186 and the base of transistor 182 is connected intermediate the resistor 185 and diode 186 while the emitter electrode is connected intermediate the diode 186 and winding 183. Winding 183 develops a gating pulse for transsistor 182 on alternatae half cycles of the input current to transformer 104. The diode 186 and the corresponding diode in each of the remaining two firing circuits prevent the buildup of reverse voltage on the base of the transistor to which it is connected. Thus, the other alternate half cycles of input current cannot gate transistor 182. The emitter of gating transistor 182 is connected to the anode of a silicon controlled rectifier 188, the gate and cathode electrodes of which are connected to a resistor 190. The cathode of controlled rectifier 188 is also connected to the gate electrode of controlled rectifier 30. Winding 178 is connected to the cathode of controlled rectifier 30. A capacitor 193 and one of the output windings 194 of a transformer 192 are serially connected between the gate and cathode electrodes of controlled rectifier 188. The resistor 190 provides a discharge path for its associated capacitor 193 and decreases the sensitivity of controlled rectifier 188 so that controlled rectifier 188 fires only on positive gate pulses. The primary winding 195 of transformer 192 is connected between system bus 86 and terminal 102 of the controlled pulse generator to receive pulses from the controlled pulse generator and the output windings of transformer 192 apply these pulses to the respective firing circuits. Controlled rectifier 188 cannot fire in response to this gating pulse from transformer 192 until gating transistor 182 is rendered conducting by the previously described gating pulse from winding 183. When transistor 182 conducts, the current developed in its collector circuit by winding 178, diode 179 and capacitor 180 is applied through resistor 181 and transistor 182 across the anode-cathode circuit of rectifier 188. Because the anode-cathode circuit of rectifier 188 includes the gate-cathode circuit of controlled rectifier 30, the firing of controlled rectifier 188 will cause the firing of rectifier 30. The circuit and operation for the firing circuits of controlled rectifiers 34 and 38 are identical to that of rectifier 30.

The firing circuit for rectifier 34 includes output winding 196 of transformer 105 connected to a capacitor 198 and a diode 199 to supply direct current power through resistor 200 to the collector of a transistor 202. A winding 203 of transformer 105 is connected to a resistor 204 and a diode 205 to provide a direct current bias for the emitter electrode of transistor 202 and the base of transistor 202 is connected intermediate resistor 204 and diode 205. The emitter electrode of transistor 202 is connected to the anode of a silicon controlled rectifier 206. A resistor 207 is connected between the gate and cathode electrodes of rectifier 206. A capacitor 208 and a winding 209 of transformer 192 are serially connected between the gate and cathode of controlled rectifier 206. The output of silicon controlled rectifier 206 is delivered from its cathode to the gate of controlled rectifier 34 and through the cathode of rectifier 34 to the winding 196.

The firing circuit for rectifier 38 includes an output winding 210 of transformer 106 connected to a capacitor 211 and a diode 212 to supply direct current bias through a resistor 213 to the collector electrode of a transistor 215. A winding 216 of transformer 106 is connected to a resistor 217 and a diode 218 to supply emitter bias to transistor 215 and the base electrode of transistor 215 is connected intermediate resistor 217 and diode 218. The emitter electrode of transistor 215 is connected to a silicon controlled rectifier 220 and a resistor 221 is connected between the gate and cathode electrodes of controlled rectifier 220 while a capacitor 222 and a winding 223 of transformer 192 are connected in parallel with resistor 221. The output of controlled rectifier 220 is applied to the gate electrode of controlled rectifier 38 in a manner identical to that of rectifiers 188 and 206.

When a positive increment of potential occurs at the output 24 (for example, the load decreases), this increment is applied across reference amplifier 26 input terminals 64, 65 where it causes decreased current flow from output terminal 88 of reference amplifier 26. The decreased current flow from terminal 88 flows through resistor 91 to decrease the base bias on transistor 90 and thus decrease the charging rate of capacitor 97. Because the capacitor 97 charges more slowly, the frequency of the output from unijunction transistor 95 decreases. This decrease in output frequency causes the respective firing circuit controlled rectifier to fire later in the respective input cycle, thereby delivering firing pulses to the gates of controlled rectifiers 30, 34 and 38 later in the respective sine wave input cycles. This results in a decrease in the pulse width on the input windings 42, 43 and 44 and a decrease in output potential. A converse operation takes place throughout the system for decreases in output potential.

If the system fails to rapidly correct for output voltage increments or return to a stable value but is unstable, or oscillates between values above and below the desired value, the loop equalization network 93, 94 must be adjusted. This is done by varying resistor 93 until the oscilation stops.

While we have described and shown a three-phase rectifier, it is understood that the concepts thereof could be applied to other types of polyphase rectifiers without departing from the spirit and scope of this invention.

What is claimed is:
1. A polyphase rectifier comprising:
   power transformer means having a plurality of interconnected input windings and a plurality of interconnected output windings;
   polyphase power input terminals;
   controlled rectifier means connected between each of said input terminals and each of said input windings and each including a control electrode;
   power rectifier means coupled to each of said output windings;
   output means connected to said power rectifier means;
   voltage difference means connected to said power rectifier means for comparing the potential at said power rectifier means to a reference potential and delivering an output signal indicative of the potential difference obtained by this comparison;
   triggered pulse generator means coupled to the output of said voltage difference means;
   synchronizing means coupled between said power input terminals and said triggered pulse generator means; and
   firing means coupled to said input terminals, coupled to said pulse generator means and coupled to said control electrodes of said controlled rectifier means for accurately controlling the initiation of the firing of said controlled rectifier means to thereby closely regulate the direct current potential at said output means.

2. In a polyphase rectifier, the combination comprising:
power transformer means having a plurality of interconnected input windings and a plurality of interconnected output windings;
controlled rectifier means connected to each of said input windings and each including a controlled rectifier having a gate electrode;
input means for supplying polyphase power to said rectifier means;
power rectifier means connected to said output windings for supplying a direct current output;
output means connected to said power rectifier means;
voltage difference means connected to said power rectifier means for comparing the potential of said power rectifier means to a reference potential and delivering an output signal indicative of the potential difference of this comparison;
triggered pulse generator means coupled to the output of said reference voltage means to be actuated by signals therefrom;
synchronizing means connected to said input means and having an output connected to said pulse generator means;
firing means coupled to said input means and to said gate electrodes of each of said controlled rectifiers; and
means coupling said triggered pulse generator to said firing means whereby said firing means energizes said gate electrodes in response to a combination of signals from said pulse generator and said power input means.

3. In a three-phase rectifier, the combination comprising:
power transformer means having at least three input windings and at least three interconnected output windings for delivering power to a load;
controlled rectifier means connected to each of said input windings and each having a gate electrode;
input means for supplying three-phase power to said controlled rectifier means;
synchronizing means connected to said input means, said synchronizing means including phase shift means for deriving pulses from the three-phase power applied to said input means and shifting the phase of said pulses relative to the three-phase input power and differentiating means coupled in said synchronizing means to differentiate said phase shifted pulses;
triggered pulse generator means coupled to said synchronized means to receive differentiated pulses therefrom and coupled to said output windings to receive signals therefrom, said generator generating pulses in response to a combination of said differentiatel pulses and said signals; and
firing means connected to said gate electrodes of said controlled rectifier means for selectively controlling the conduction thereof and connected to said triggered pulse generator means to be actuated by a combination of signals therefrom.

4. A three-phase rectifier system including:
power transformer means having a plurality of interconnected input windings and a plurality of interconnected output windings;
controlled rectifier means connected to each of said input windings and each including a control electrode;
power input means for supplying three-phase power to each of said controlled rectifier means;
output power rectifier means connected to said output windings for deriving direct current from alternating current in said output windings;
voltage difference means connected to said output power rectifier means for comparing the potential at said output power rectifier means to a reference potential and delivering an output signal indicative of the difference of this comparison;
triggered pulse generator means coupled to the output of said reference voltage means for generating pulses in response to signals from said reference voltage means;
synchronizing means coupled to said power input means and including means for developing synchronizing pulses and for controlling the phase of these pulses relative to the power supplied to said power input means, said synchronizing means being coupled to said triggered pulse generator means; and
firing means connected to each of said control electrodes, said firing means being connected to each of said power input means and to said triggered pulse generator means for accurately controlling the firing of said controlled rectifier means to thereby regulate the direct current power delivered by said output power rectifier means.

5. In a three-phase rectifier system, the combination comprising:
power transformer means having a plurality of interconnected input windings and a plurality of interconnected output windings;
controlled rectifier means connected to each of said input windings and each including a control electrode;
power three-phase means for supplying three-phase power to each of said controlled rectifier means;
output power rectifier means connected to each of said output windings;
voltage difference means connected to said output power rectifier means for comparing the potential at said output power rectifier means to a reference potential and delivering an output signal indicative of the difference of this comparison;
triggered pulse generator means coupled to the output of said difference voltage difference means and actuated by said difference signals for generating pulses in response thereto, said triggered pulse generator means including a loop equalization network for stabilizing said system;
synchronizing means coupled to said power input means and coupled to said triggered pulse generator means for supplying synchronizing signals to said triggered pulse generator; and
firing means connected to each of said controlled rectifier means, coupled to said triggered pulse generator means and coupled to said three-phase power means for accurately firing said controlled rectifier means thereby to regulate the output power potential at said output rectifier means.

6. In a solid state, three-phase rectifier, the combination comprising:
power transformer means having a plurality of interconnected input windings and a plurality of interconnected output windings for transforming the voltage level of the power supplied thereto;
a plurality of solid state controlled rectifiers, one connected to each of said input windings and each having a control electrode for selectively controlling the power supplied to said input windings;
three-phase power input means connected to each of said controlled rectifiers for supplying three-phase power thereto;
output power means coupled to each of said output windings;
synchronizing means coupled to said power input means for developing a series of output pulses synchronized with the three-phase input power and including:
rectifier means connected to each phase of the input power means for rectifying signals therefrom, said rectifier means having a common output terminal,
phase shift control means having its input connected to said common output terminal for shifting the phase of signals received therefrom, semiconductor means connected to each phase of said input power means for selectively controlling the transmission of signals therefrom, means connecting said phase shift control means to each of said semiconductor means for controlling the conduction thereof, differentiating means connected to the output of each of said semiconductor means for differentiating output signals therefrom, rectifier means connected to each of said differentiating means and having a common output terminal for supplying rectified signals to said common output terminal from each of said differentiating means, and a semiconductor device including one electrode connected to said last-mentioned common output terminal, said semiconductor device including two other electrodes;

a triggered pulse generator including a capacitor connected between said two other electrodes, a transistor coupled to said capacitor, and means for controlling the charging rate of said capacitor;

voltage difference means connected to said output power means for comparing the potential at said output power means to a reference potential and delivering an output signal indicative of the difference of this comparison; and firing means coupled to the control electrode of each of said solid state controlled rectifiers, coupled to said three-phase power input means and coupled to the output of said triggered pulse generator for controlling the periods of conduction of said controlled rectifiers.

7. In a variable pulse width, three-phase rectifier system, the combination comprising:

power transformer means having a plurality of interconnected input windings and a plurality of interconnected output windings for transforming the voltage of power applied to said input windings;

a plurality of semiconductor devices, one serially connected to each of said input windings and each including an anode, a cathode and a gate electrode;

input means for applying three-phase power to said semiconductor devices;

output means coupled to each of said output windings for supplying power from said output windings to a load;

firing means connected between the gate and cathode electrodes of each of said semiconductor devices for controlling the conduction thereof;

synchronizing means connected to said power input means for developing synchronizing pulses therefrom including:

phase adjusting means coupled to said power input means for adjusting the phase of the pulses developed by said synchronizing means relative to the power supplied to said synchronizing means, differentiating means coupled to said phase adjusting means for developing sharp pulses of short duration from said phase adjusted pulses, semiconductor means connected to the output of said differentiating means and having at least three electrodes for delivering an output signal in response to said pulses from said differentiating means; and triggered pulse generator means including an oscillator circuit having a frequency controlling capacitor, each of two electrodes of said semiconductor means being connected to one of the electrodes of said capacitor, a third electrode of said semiconductor means being connected to said differentiating means, said semiconductor means being rendered conductive by pulses from said differentiating means to thereby discharge said capacitor and start the charging cycle of said capacitor, said triggered pulse generator means being coupled to said firing means for controlling the initiation of the operation of said firing means.

8. In a three-phase rectifier system, the combination comprising:

power transformer means having a plurality of input windings interconnected in a three-phase network and a plurality of output windings interconnected in a three-phase network;

a plurality of controlled impedance devices, each connected in series with one of said input windings and each including a control electrode;

three-phase power input means connected to each of said controlled impedance devices;

firing means coupled to said three-phase power input means and coupled to the control electrode of each of said controlled impedance devices for selectively controlling the periods of conduction of said controlled impedance devices, said firing means including a semiconductor pulse gate and a semiconductor impedance device for each of said controlled impedance devices, each of said semiconductor impedance devices being connected between one of said pulse gates and one of said controlled impedance devices; and means coupled to said output windings for controlling the firing of said semiconductor impedance devices in accordance with a potential derived from said output windings.

9. In a three-phase rectifier system, the combination comprising:

power transformer means having a plurality of interconnected input windings and a plurality of interconnected output windings for transforming the voltage level of power applied thereto;

at least three power input terminals;

a plurality of controlled unilateral impedance devices, each connected between one of said input terminals and one of the input windings, each of said controlled unilateral impedance devices including a cathode, an anode and a control electrode;

firing means coupled to said input terminals and to each of said control electrodes for controlling the periods of conduction thereof, said firing means including a semiconductor pulse gate and a semiconductor rectifier having at least three electrodes and serially connected between said semiconductor pulse gate and the control electrode of one of said controlled unilateral impedance devices, said system further including means coupled between two electrodes of said semiconductor rectifier and said output windings for accurately controlling the firing thereof in accordance with a potential derived from said output windings.

10. In a three-phase rectifier, the combination comprising:

an input terminal for each phase;

a plurality of controlled rectifiers, each coupled to one input terminal, each including a control electrode;

a firing circuit coupled to each of said control electrodes;

a synchronizing circuit coupled to said input terminals and including:

phase shift means coupled to said input terminals and including a three electrode semiconductor with one electrode coupled to one of said input terminals for shifting the phase of signals applied thereto, variable bias means for biasing said semi-conductor including rectifier means coupled to one of said input terminals and one of said three electrodes, and differentiating means coupled to the output of said semiconductor for differentiating signals applied thereto; and pulse generator means coupled between said differentiating means and each of said firing circuits for applying pulses to said firing circuit in response to said differentiated pulses.

References Cited

UNITED STATES PATENTS

| | | | |
|---|---|---|---|
| 3,183,376 | 5/1965 | Boyer | 321—46 |
| 3,134,068 | 5/1964 | Fettman | 321—18 |
| 3,114,098 | 12/1963 | Rallo et al. | 321—18 |
| 3,058,047 | 10/1962 | Tajhl | 321—18 |
| 3,176,215 | 3/1965 | Kusko | 323—22 |
| 3,189,810 | 6/1965 | MacGregor | 323—22 |

FOREIGN PATENTS 676,658   12/1963   Canada.

JOHN F. COUCH, *Primary Examiner.*

WARREN E. RAY, *Examiner.*

M. L. WACHTELL, H. HUBERFELD, *Assistant Examiners.*